(12) United States Patent
Jiang et al.

(10) Patent No.: US 12,523,757 B2
(45) Date of Patent: Jan. 13, 2026

(54) METHOD AND APPARATUS FOR DETERMINING ANGLE, METHOD AND APPARATUS FOR TRANSMITTING SIGNALS

(71) Applicant: BEIJING XIAOMI MOBILE SOFTWARE CO., LTD., Beijing (CN)

(72) Inventors: Xiaolei Jiang, Beijing (CN); Guangjun Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 541 days.

(21) Appl. No.: 17/853,721

(22) Filed: Jun. 29, 2022

(65) Prior Publication Data

US 2023/0269040 A1    Aug. 24, 2023

(30) Foreign Application Priority Data

Feb. 21, 2022   (CN) .......................... 202210157087.8

(51) Int. Cl.
*G01S 3/48* (2006.01)
*G01S 3/04* (2006.01)
*G01S 13/76* (2006.01)
*H04B 1/7163* (2011.01)
*G01S 5/02* (2010.01)

(52) U.S. Cl.
CPC .............. *G01S 13/765* (2013.01); *G01S 3/04* (2013.01); *G01S 3/48* (2013.01); *H04B 1/7163* (2013.01); *G01S 3/043* (2013.01); *G01S 5/0205* (2013.01); *H04B 2201/71634* (2013.01)

(58) Field of Classification Search
CPC ....... H04L 5/0023; G01S 3/48; G01S 13/765; G01S 3/043; G01S 3/04; G01S 5/0205; H04B 1/7163; H04B 2201/71634
See application file for complete search history.

(56) References Cited

U.S. PATENT DOCUMENTS 12,164,045 B2 * 12/2024 Merk ....................... G01S 11/06
2019/0331781 A1  10/2019 McLaughlin et al.
2020/0106877 A1   4/2020 Ledvina et al.
2020/0359275 A1  11/2020 Li et al.

FOREIGN PATENT DOCUMENTS

EP            3764706 A1     1/2021
WO    WO-2021261818 A1 * 12/2021
WO    WO-2023151434 A1 *  8/2023

OTHER PUBLICATIONS

Translation of WO-2023151434-A1 (Year: 2023).*
Translation of WO-2021261818 (Year: 2021).*
Extended European Search Report issued in Application No. 22182277.8, dated Aug. 12, 2022,(8p).

* cited by examiner

*Primary Examiner* — Matthew M Barker
(74) *Attorney, Agent, or Firm* — Arch & Lake LLP

(57) ABSTRACT

A method for determining an angel includes: sending a control message to a target device on a first channel. The control message carries at least channel switch information configured to instruct the target device to transmit signals on a second channel. The method further includes determining an angle from the target device to the terminal according to a first signal and a second signal. The first signal transmitted by the target device is received on the first channel. The second signal transmitted by the target device is received on the second channel.

9 Claims, 7 Drawing Sheets sending a control message to a target device on a first channel, wherein the control message carries at least channel switch information configured to instruct the target device to transmit signals on a second channel — S101 switching to a second channel within the target time domain resource, to receive the signal transmitted by the target device — S601 determining an angle from the target device to the terminal according to a first signal and a second signal — S102

METHOD AND APPARATUS FOR DETERMINING ANGLE, METHOD AND APPARATUS FOR TRANSMITTING SIGNALS

CROSS-REFERENCE TO RELATED APPLICATION

This application is based on and claims priority to Chinese Patent Application Serial No. 202210157087.8, filed on Feb. 21, 2022, the entire contents of which are incorporated herein by reference for all purposes.

TECHNICAL FIELD

The disclosure relates to the field of communication technology, in particular to a method and an apparatus for determining an angle, a method and an apparatus for transmitting signals, an electronic device, and a computer readable storage medium.

BACKGROUND

On devices such as terminals, a distance to a target device and an angle between the target device and the terminal can be measured through an Ultra Wide Band (UWB) technology.

For example, the terminal and the target terminal need to communicate on a same system, for measuring the angle between the target device and the terminal, such as an angle of arrival (AOA). This process generally needs to be implemented by two antennas. For example, the angle is calculated according to a phase difference for receiving the signal transmitted by the target device through the two antennas, and it is necessary to ensure that the distance between the two antennas is less than or equal to a half wavelength corresponding to the above channel.

In the case where the distance between the two antennas is greater than the above half wavelength, the phase difference of the two antennas is not unique in half space (within)+90°, which leads to the relationship between the phase difference and AOA not monotonic, multiple AOAs will be calculated according to the phase difference, and thus the AOA cannot be accurately determined.

SUMMARY

According to a first aspect of the present disclosure, a method for determining an angle is provided. The method is applied to a terminal, and includes:
  sending a control message to a target device on a first channel, wherein the control message carries at least channel switch information, and the channel switch information is configured to instruct the target device to transmit signals on a second channel; and
  determining an angle from the target device to the terminal according to a first signal and a second signal, wherein the first signal transmitted by the target device is received on the first channel, and the second signal transmitted by the target device is received on the second channel.

According to a second aspect of the present disclosure, a method for transmitting signals is provided. The method is applied to a target device, and includes:
  receiving, on a first channel, a control message sent by the terminal; and
  switching to a second channel to transmit signals according to channel switch information carried in the control message, wherein the target device is configured to transmit a first signal to the terminal on the first channel, and transmit a second signal to the terminal on the second channel, so that the terminal determines an angle from the target device to the terminal according to the first signal and the second signal.

According to a third aspect of the present disclosure, an electronic device is provided. The electronic device includes: a first antenna, a second antenna, and a processor; a memory configured to store instructions executable by the processor; wherein, the processor is configured to implement the above method for determining an angle.

According to a fourth aspect of the present disclosure, an electronic device is provided. The electronic device includes: a processor; and a memory configured to store instructions executable by the processor; wherein, the processor is configured to implement the above method for transmitting signals.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
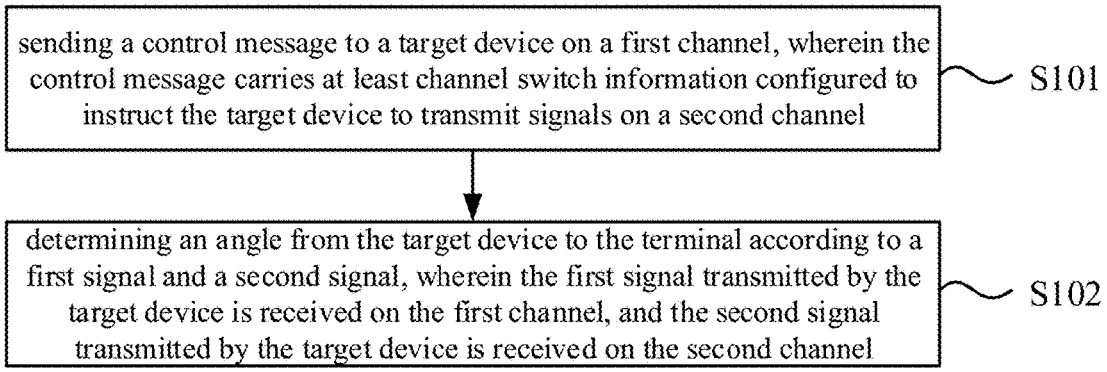
FIG. 1 is a schematic flowchart of a method for determining an angle according to an embodiment of the present disclosure.

FIG. 1 is a schematic flowchart of a method for determining an angle according to an embodiment of the present disclosure. The method for determining an angle can be applied to a terminal, and the terminal includes but is not limited to an electronic device such as a mobile phone, a tablet computer, a wearable device, and a personal computer.

In one or more embodiments, the terminal can measure a distance to a target device and an angle between the target device and the terminal, for example, an incident angle of the target device towards the terminal, which can also be called an angle of arrival (AOA), using the ultra-wideband technology.

In one or more embodiments, the terminal is provided with at least a first antenna and a second antenna, and the terminal can measure the angle through the first antenna and the second antenna.

As shown in FIG. 1, the method for determining an angle may include the following steps.

In step S101, a control message is sent to a target device on a first channel, wherein the control message carries at least channel switch information, and the channel switch information is configured to instruct the target device to transmit a signal on a second channel.

In step S102, an angle from the target device to the terminal is determined according to a first signal and a second signal, wherein the first signal transmitted by the target device is received on the first channel, and the second signal transmitted by the target device is received on the second channel.

It should be noted that, the operation of receiving the first signal transmitted by the target device on the first channel may be performed before sending the control message to the target device, or may be performed after sending the control message to the target device, and the operation of receiving the second signal transmitted by the target device on the second channel may be performed before sending the control message to the target device, or may be performed after sending the control message to the target device. The specific execution order may be set as required.

Figure 2A:
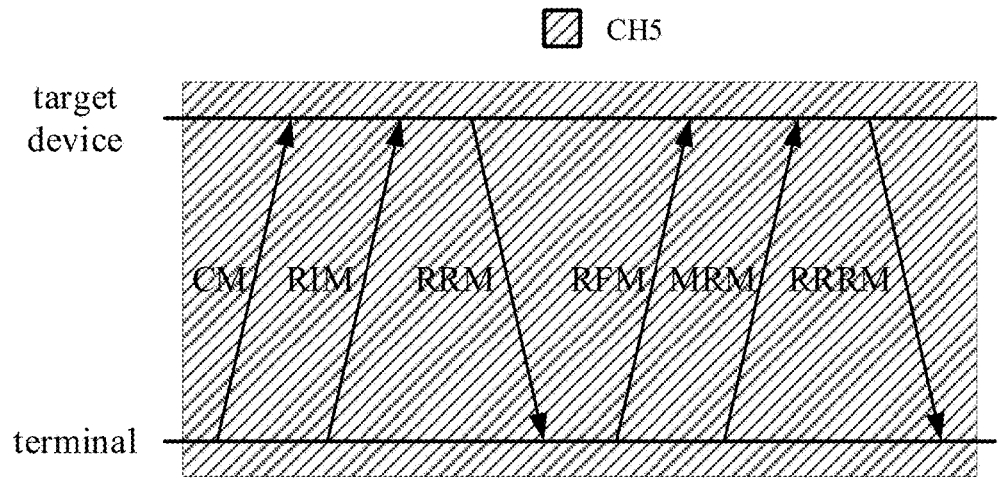
FIG. 2A is a schematic diagram of two-way ranging according to an embodiment of the present disclosure.

FIG. 2A is a schematic diagram of two-way ranging according to an embodiment of the present disclosure.

As shown in FIG. 2A, the terminal can perform two-way ranging (TRW) on CH5 through ultra-bandwidth, and the two-way ranging includes but is not limited to unilateral two-way ranging and bilateral two-way ranging. Two-way ranging mainly includes the following steps:

the terminal sends a control message (CM) to the target device on the first channel;

the terminal sends a ranging initiation message (RIM) to the target device on the first channel;

the target device sends a ranging response message (RRM) to the terminal on the first channel;

the terminal sends a ranging final message (RFM) to the target device on the first channel;

the terminal sends a measurement report message (MRM) to the target device on the first channel;

the target device sends a ranging result report message (RRRM) to the terminal on the first channel.

For example, the first channel may be CH5. In the steps of two-way ranging, the terminal receiving the content sent by the target device may include two steps, that is, the terminal receives the RRM sent by the target device, and the terminal receives the RRRM sent by the target device. Therefore, the signal transmitted by the target device and received by the terminal on the first channel may be either the RRM sent by the target device or the RRRM sent by the target device.

Figure 2B:
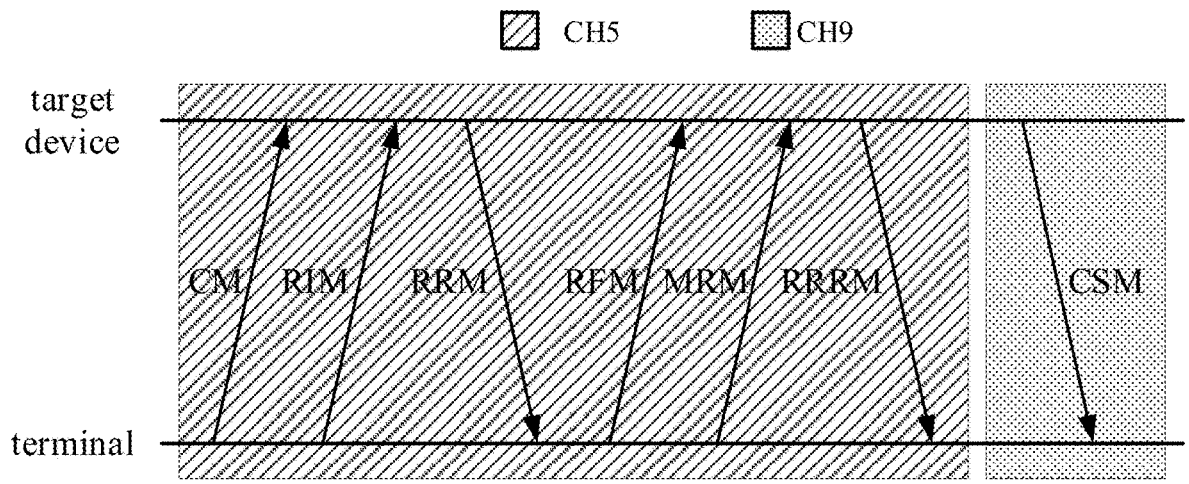
FIG. 2B is a schematic diagram of another two-way ranging according to an embodiment of the present disclosure.

FIG. 2B is a schematic diagram of another two-way ranging according to an embodiment of the present disclosure.

As shown in FIG. 2B, after the target device completes two-way ranging with the terminal, the target device can switch to the second channel (e.g., CH9) to transmit a signal to the terminal. For example, the transmitted signal is called a channel switch message (CSM).

In one or more embodiments, the terminal switches to the second channel to receive the signal transmitted by the target device. On one hand, the terminal needs to switch to the second channel, and on the other hand, the target device also needs to switch to the second channel.

In order to enable the target device to switch to the second channel, when the terminal performs two-way ranging with the target device on the first channel, the terminal can carry channel switch information in the CM sent to the target device, and instruct the target device to switch to the second channel for transmitting signals through the channel switch information.

Therefore, after performing two-way ranging with the terminal on the first channel, for example, after sending the RRRM to the terminal, the target device can switch to the second channel according to the channel switch information, to transmit signals to the terminal. Accordingly, there is no need to indicate to the target device that it needs to switch to the second channel to transmit signals through a separate piece of information, which is beneficial to saving communication resources.

Figure 3:
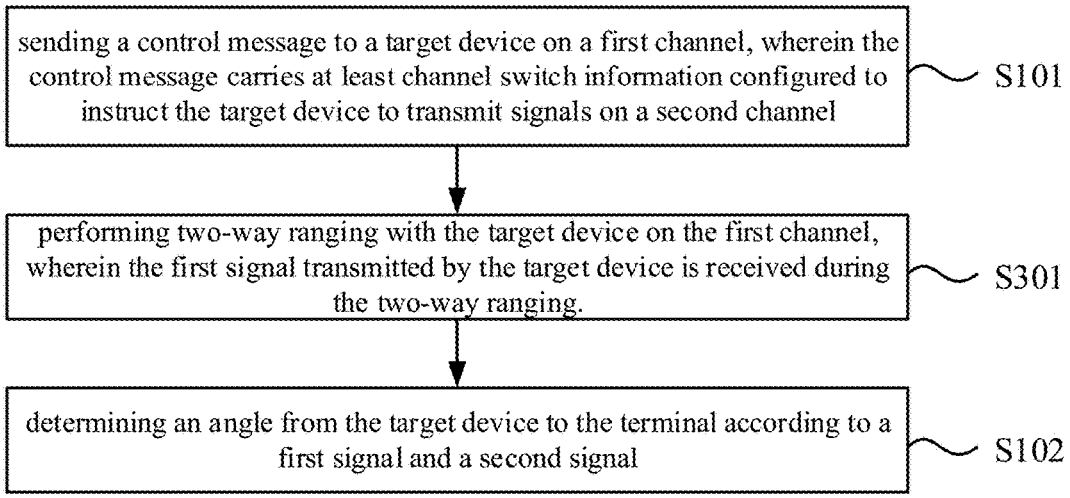
FIG. 3 is a schematic flowchart of another method for determining an angle according to an embodiment of the present disclosure.

FIG. 3 is a schematic flowchart of another method for determining an angle according to an embodiment of the present disclosure. As shown in FIG. 3, the method further includes following steps.

In step S301, two-way ranging is performed with the target device on the first channel, wherein the first signal transmitted by the target device is received during the two-way ranging.

In one or more embodiments, in order to determine the angle, a difference between a first phase difference and a second phase difference needs to be determined, and then the angle is determined according to the difference. In order to determine the difference, the terminal needs to first receive the signal transmitted by the target device on the first channel, and then switch to the second channel to receive the signal transmitted by the target device.

At present, the terminal generally determines the first phase difference in the process of performing two-way ranging with the target device. Therefore, in this embodiment, the terminal may be set to determine the first phase difference in the process of performing two-way ranging with the target device on the first channel, without setting the terminal to determine the first phase difference in another separate process.

Figure 4:
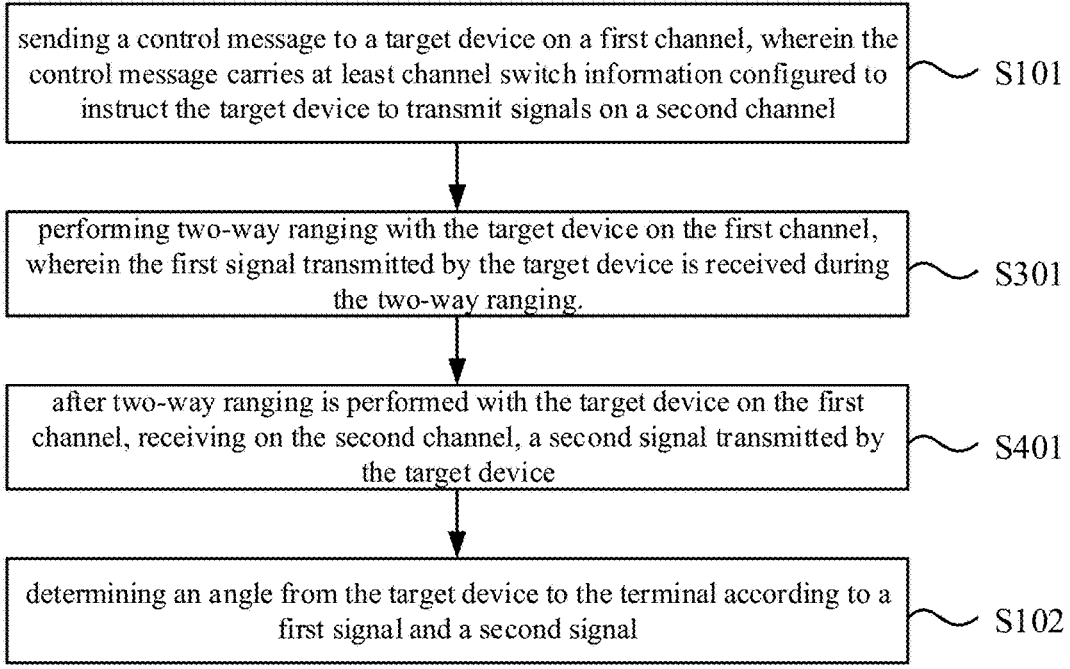
FIG. 4 is a schematic flowchart of still another method for determining an angle according to an embodiment of the present disclosure.

FIG. 4 is a schematic flowchart of still another method for determining an angle according to an embodiment of the present disclosure. As shown in FIG. 4, the method further includes following steps.

In step S401, after two-way ranging is performed with the target device on the first channel, a second signal transmitted by the target device is received on the second channel.

Figure 5A:
FIG. 5A is a schematic diagram of a time domain resource in the related art.
Figure 5B:
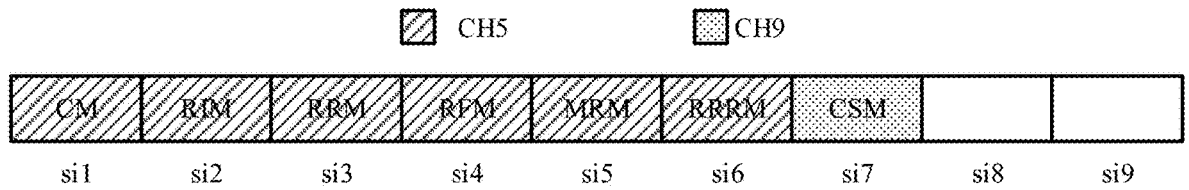
FIG. 5B is a schematic diagram of a time domain resource according to an embodiment of the present disclosure.

FIG. 5A is a schematic diagram of a time domain resource in the related art. FIG. 5B is a schematic diagram of a time domain resource according to an embodiment of the present disclosure.

As shown in FIG. 5A, the terminal performs two-way ranging with the target device, and the target device can receive the CM sent by the terminal on the first channel (for example, CH5) in si1, where si1 represents a time slot with a slot index of 1 (the meaning of subsequent abbreviations is analogous); receive the RIM sent by the terminal on the first channel in si2; send the RRM to the terminal on the first channel in si3; receive the RFM sent by the terminal on the first channel in si4; receive the MRM sent by the terminal on the first channel in si5; and send the RRRM to the terminal on the first channel in si6.

According to an embodiment of the present disclosure, as shown in FIG. 5B, the target device can determine that the target time domain resource is si7 according to the time domain resource information, such that the target device can switch to the second channel (e.g., CH9) in si7 to transmit a signal, such as CSM to the terminal.

Accordingly, in the process of transmitting and receiving signals from si1 to si6, it is not necessary to switch to the second channel, so that a complete two-way ranging process can be completed between the terminal and the target device on the first channel (for example, the operation corresponding to si1 to si6), and then switch to the second channel for communication, so that the current two-way ranging process does not need to be changed, which facilitates the expansion and implementation of this embodiment.

In one or more embodiments, the channel switch information is carried in reserved bits of the control message.

In one or more embodiments, part of the content in the control message may be shown in Table 1 below:

TABLE 1

| Parameter | Size(bits) | Notes |
| --- | --- | --- |
| Vendor OUI | 24 | 0x5A18FF |
| UWB message ID | 4 | 0x3 = Control Message |
| Channel switch | 3 | 0 channel switch disabled |
| | | 1 switch to CH5 |
| | | 2 switch to CH6 |

TABLE 1-continued

| Parameter | Size(bits) | Notes |
| --- | --- | --- |
| | | 3 switch to CH8 |
| | | 4 switch to CH9 |
| | | Note: if switched channel is same as current channel, this filed will be skip |
| Reserved | 1 | Reserved for future use |
| Message control | 16 | Configuration of the message |
| Stride length | 8 | Number of blocks to be skipped |
| ... | | |

In the related art, the control message may include parameters such as UWB message ID, Reserved, Message control, Stride length, etc., wherein the reserved bits may be 4 bits.

As shown in Table 1, in this embodiment, channel switch information may be further added in the control message, and the channel switch information may be carried in the reserved bits. For example, 3 bits in the reserved bits are occupied, and then 1 bit is left in the reserved bits.

For example, if the channel switch information is 0, it may indicate channel switch disabled; if the channel switch information is 1, it may indicate switching to channel 5 (CH5); if the channel switch information is 2, it may indicate switching to channel 6 (CH6); If the channel switch information is 3, it may indicate switching to channel 8 (CH8); if the channel switch information is 4, it may indicate switching to channel 9 (CH9).

In one or more embodiments, the channel switch information is configured to indicate at least one of the following:
  channel switching disabled;
  a target channel to switch to.

As shown in Table 1, the channel switch information can not only indicate the target channel that the target device needs to switch to, that is, the second channel, but also indicate the channel switch disabled. For example, when the channel switch information is 0, it indicates the channel switch disabled, so that it is possible to control whether the target device can perform channel switch, so as to prevent the target device from switching to another channel by mistake, which causes problems with the terminal sending and receiving signals from the target device.

In one or more embodiments, the control message further carries time domain resource information, which is configured to instruct the target device to switch to the second channel within the target time domain resource, for transmitting signals.

Figure 6:
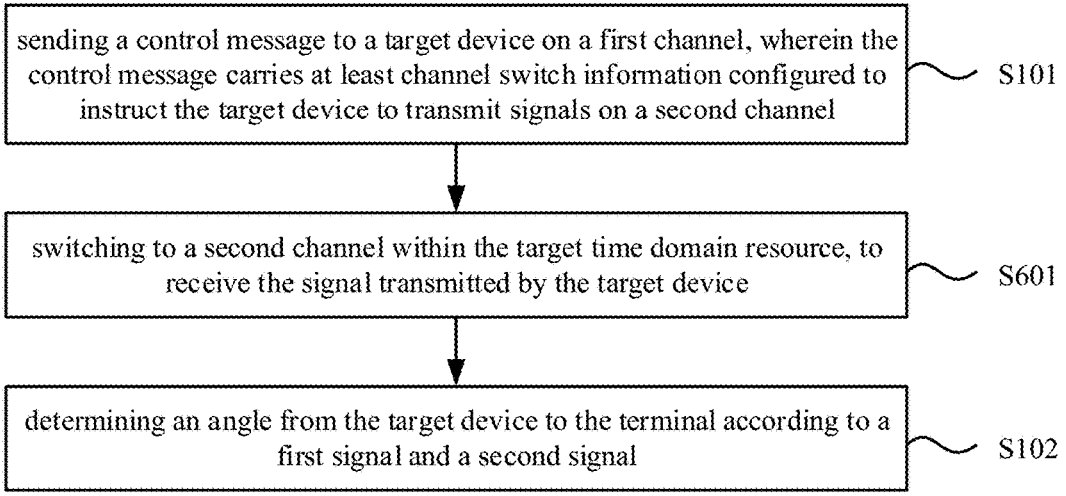
FIG. 6 is a schematic flowchart of yet another method for determining an angle according to an embodiment of the present disclosure.

FIG. 6 is a schematic flowchart of yet another method for determining an angle according to an embodiment of the present disclosure. As shown in FIG. 6, the method further includes step S601.

In step S601, switch to a second channel within the target time domain resource to receive a signal transmitted by the target device.

In one or more embodiments, when the terminal instructs the target device to perform communication, on one hand, it needs to indicate the frequency domain resource for communication to the target device, and on the other hand, it also needs to indicate the time domain resource for communication to the target device. The channel switch information may instruct the target device to switch to the second channel for communication, and the second channel is equivalent to the frequency domain resource.

On this basis, this embodiment further carries time domain resource information in the control message to instruct the target device to switch to the second channel within the target time domain resource, for transmitting signals, so that on the one hand, the terminal can switch to the second channel within the target time domain resource to receive the signal transmitted by the target device, and on the other hand, the target device can switch to the second channel in the target time domain resource to transmit signals to the terminal, to ensure that the terminal can receive the signal transmitted by the target device on the second channel in the target time domain resource, thereby determining the second phase difference.

In one or more embodiments, the time domain resource information is carried in a ranging device management list of the control message.

In the control message CM, in addition to the elements shown in Table 1, it can also include other elements, such as the ranging device management list. Some elements of the ranging device management list may be shown in Table 2 below:

TABLE 2

| Parameter | Size(bits) | Notes |
| --- | --- | --- |
| Ranging Role | 1 | 0: Responder<br>1: Initiator |
| Ranging Slot Index | 8 | Assigned slot |
| Address | 16 | Address of ranging device |
| Scheduled UWB message | 4 | ID of UWB message which will be conveyed in the slot |
| Stop Ranging | 1 | 0: Ranging will be continued<br>1: Ranging will be stoped |
| Reserved | 2 | Reserved for future use |

As shown in Table 2, the ranging device management list may include Ranging Role, Ranging Slot Index, Address, Scheduled UWB Message, Stop Ranging, and Reserved.

The time domain resource information is carried by the control message CM, which, specifically, may be carried in the ranging device management list, for example, indicated by the ranging slot index in Table 2. In the related art, for example, as shown in FIG. 5A, the ranging slot indices may indicate si1 to si6, and in this embodiment, the ranging slot indices may also indicate si7.

In one or more embodiments, the control message includes the ranging device management list, and the ranging device management list includes the scheduled UWB message, and the scheduled UWB message carries identification information for indicating an identifier of a signal transmitted by the target device on the second channel.

In one or more embodiments, an identifier of the CSM that needs to be sent by the target device can also be indicated by the scheduled UWB message in Table 2, so that the target device can send the CSM corresponding to the identifier in si7. For example, the identifier corresponding to CSM can be added on the basis of the identifier corresponding to the sent message in the related art, so that the terminal can determine according to the identifier that the received message is the CSM transmitted by the target device.

For example, the UWB message ID corresponding to the message can be shown in Table 3 below:

TABLE 3

| UWB message ID | UWB message | Format subclaus |
| --- | --- | --- |
| 0x0 | Ranging Initiation Message | section 5.9.1 |
| 0x1 | Ranging Response Message | section 5.9.2 |
| 0x2 | Ranging Final Message | section 5.9.3 |
| 0x3 | Control message | section 5.9.4 |
| 0x4 | Measurement Report Message | section 5.9.6, |

TABLE 3-continued

| UWB message ID | UWB message | Format subclaus |
| --- | --- | --- |
| | | section 5.9.6 |
| 0x5 | Ranging result report message | section 5.9.7 |
| 0x6 | Control Update Message | section 5.9.8 |
| 0x7 | Channel Switch Message | |
| 0x8~0xF | Reserved for other UBW message | N/A |

As shown in Table 3, the identifiers corresponding to messages such as RIM, RRM, RFM, and CM are shown. In this embodiment, an identifier 0×7 may be added in the table to represent the CSM.

Figure 7:
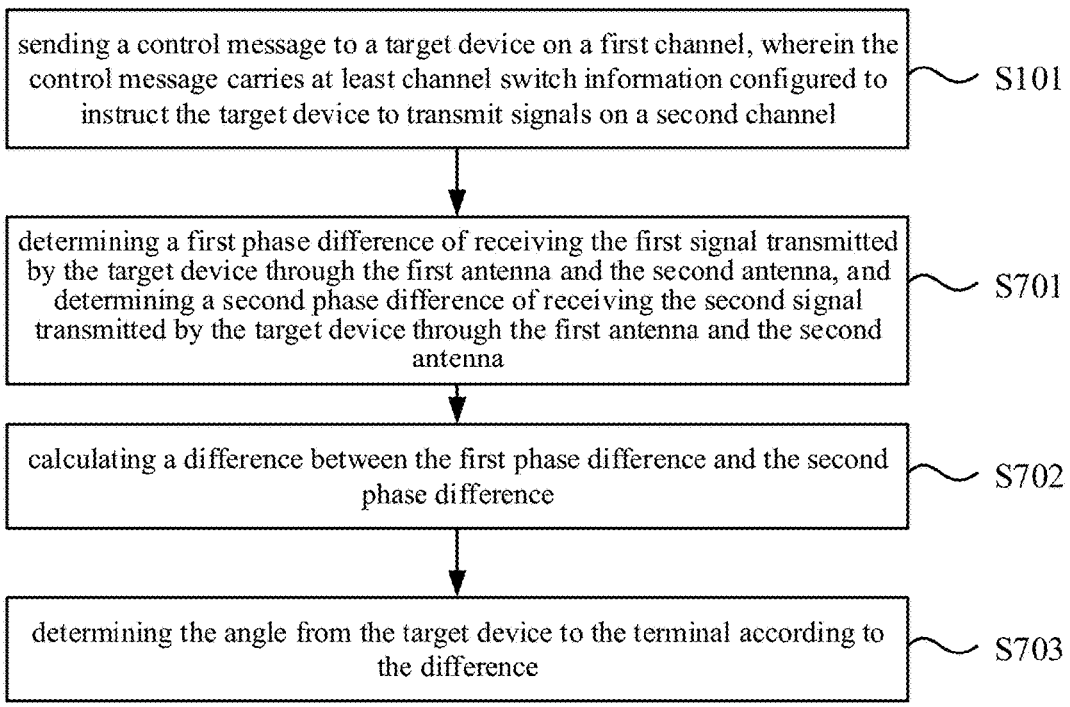
FIG. 7 is a schematic flowchart of yet another method for determining an angle according to an embodiment of the present disclosure.

FIG. 7 is a schematic flowchart of yet another method for determining an angle according to an embodiment of the present disclosure. As shown in FIG. 7, the terminal is provided with at least a first antenna and a second antenna, and the determining the angle from the target device to the terminal according to the first signal and the second signal includes following steps.

In step S701, a first phase difference for receiving the first signal transmitted by the target device through the first antenna and the second antenna is determined, and a second phase difference for receiving the signal transmitted by the target device through the first antenna and the second antenna is determined.

In step S702, a difference between the first phase difference and the second phase difference is calculated.

In step S703, the angle from the target device to the terminal is determined according to the difference.

In one or more embodiments, the terminal may receive the signal transmitted by the target device on the first channel through the first antenna and the second antenna, and obtain the first phase difference of the signals respectively received by the two antennas.

When the distance between the first antenna and the second antenna is greater than a half wavelength corresponding to the first channel (that is, half the wavelength of the signal transmitted on the first channel), there will be problems when the angle, for example, AOA, is calculated according to the first phase difference. In the case where the distance between the first antenna and the second antenna is greater than the half wavelength, the receiving phase difference of the two antennas is not unique in the half space (within)+90°, which causes that the relationship between the difference and the AOA is not monotonic, and multiple AOAs will be calculated according to the first phase difference, so that the AOA cannot be accurately determined.

Figure 8:
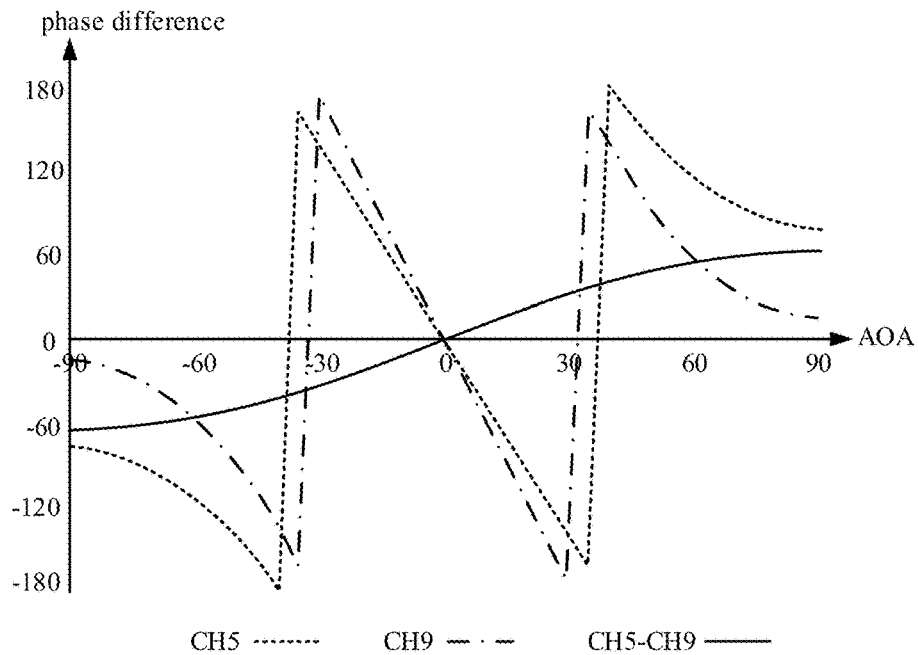
FIG. 8 is a schematic diagram showing a relationship between AOA and phase difference according to an embodiment of the present disclosure.

FIG. 8 is a schematic diagram showing the relationship between AOA and phase difference according to an embodiment of the present disclosure.

As shown in FIG. 8, for example, the first channel is channel 5 (CH5), and the corresponding frequency is 6489.6 MHz. The distance between the first antenna and the second antenna is greater than the corresponding half wavelength of CH5 (which can be calculated according to the corresponding frequency), for example, equal to one wavelength.

In this case, the phase difference between the phase at which the first antenna receives the signal transmitted by the target device at CH5 and the phase at which the second antenna receives the signal transmitted by the target device at CH5, which is calculated for example, through PDOA (Phase Difference of Arrival) algorithm, may exceed 180°, for example, is 195°.

However, due to the current phase difference calculated by the chip in the terminal ranges between −180° and 180° (for example, as shown in FIG. 2), for the phase difference whose calculation result is 195°, the output result will be 15°. However, 15° and 195° correspond to different AOAs respectively, which results in that the phase difference of 15° corresponds to two AOAs, one of which is the AOA when the phase difference is 15°, and the other is AOA when the phase difference is 195°.

It can be seen that, based on the current method of determining the phase difference, when the distance between the first antenna and the second antenna is greater than half the wavelength, the output phase difference may be different from the actual phase difference, for example, the actual phase difference is 195°, and the output phase difference is 15°, resulting in a non-monotonic relationship between the phase difference and AOA, making it difficult to accurately determine AOA.

FIG. 8 shows the correspondence between the phase difference between the first antenna and the second antenna receiving the signal transmitted by the target device on the second channel and the AOA. For example, the second channel is channel 9 (CH9), and the corresponding frequency 7987.2 MHz. It can be seen from FIG. 8 that when the distance between the first antenna and the second antenna is greater than the half wavelength corresponding to CH9, the relationship between the phase difference between the phase at which the first antenna receives the signal transmitted by the target device on CH9 and phase at which the second antenna receives the signal transmitted by the target device on CH9, and the AOA is not monotonic.

However, the relationship between the difference between the first phase difference and the second phase difference and the AOA is monotonic, for example, as the curve corresponding to CH5-CH9 shown in FIG. 8. That is, one AOA uniquely corresponds to one difference. Therefore, one angle can be accurately determined when determining the angle from the target device to the terminal according to the difference.

According to the embodiments of the present disclosure, the signal transmitted by the target device may be received on the first channel first to determine the first phase difference of receiving the signal transmitted by the target device through the first antenna and the second antenna; and then the terminal switches to the second channel to receive the signal transmitted by the target device, to determine the second phase difference of receiving the signal transmitted by the target device through the first antenna and the second antenna; then the difference between the first phase difference and the second phase difference is calculated to determine the angle from the target device to the terminal, for example AOA. Since the relationship between the difference and the angle from the target device to the terminal is monotonic, one angle, that is, the angle from the target device to the terminal, can be accurately determined according to the difference, instead of multiple angles.

It should be noted that the first channel and the second channel are not limited to the above CH5 and CH9, for example, they may also be channel 6 (CH6), channel 8 (CH8), etc., wherein the corresponding frequency of CH6 is 6988.8 MHz, and the corresponding frequency of CH8 is 7488.0 MHz. That is, In one or more embodiments, the first frequency corresponding to the first channel and the second frequency corresponding to the second channel include at least one of the following:

6489.6 MHz, 6988.8 MHz, 7488.0 MHz, 7987.2 MHz.

Figure 9:
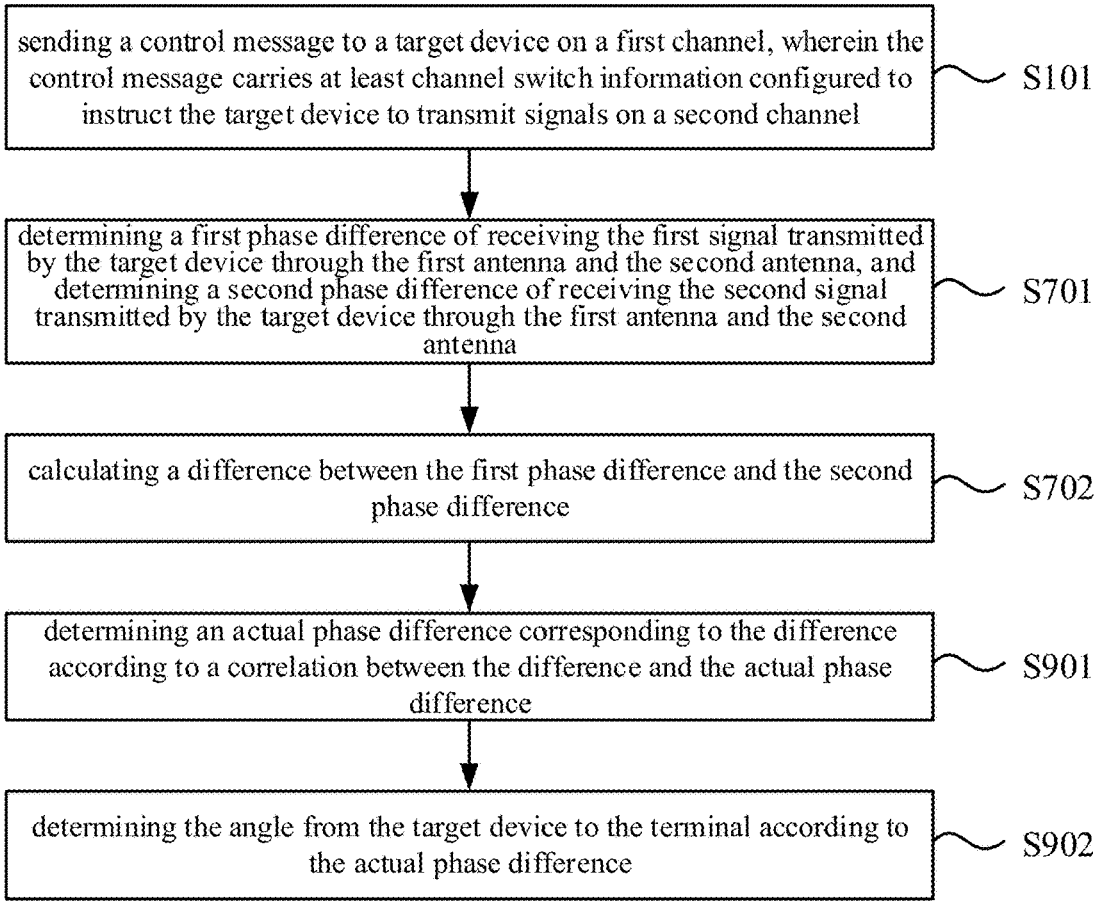
FIG. 9 is a schematic flowchart of yet another method for determining an angle according to an embodiment of the present disclosure.

FIG. 9 is a schematic flowchart of yet another method for determining an angle according to an embodiment of the present disclosure. As shown in FIG. 9, the determining the angle from the target device to the terminal according to the difference includes following steps.

In step S901, an actual phase difference corresponding to the difference is determined according to a correlation between the difference and the actual phase difference.

In step S902, the angle from the target device to the terminal is determined according to the actual phase difference.

In one or more embodiments, although there is a one-to-one correspondence between the difference and the angle from the target device to the terminal, currently calculating the angle from the target device to the terminal, such as calculating AOA, is mainly based on the actual phase difference of the first antenna and the second antenna receiving the signal transmitted by the target device on the first channel. For example, the calculation formula is:

$$\Delta\varphi = (360°/\lambda) d \cos\theta;$$

where, $\Delta\varphi$ is the actual phase difference, $\lambda$ is the wavelength corresponding to the first channel, d is the difference between the distance from the target device to the first antenna and the distance from the target device to the second antenna (may be an absolute value), and $\theta$ is the angle. Accordingly, $\theta$ can be solved from $\Delta\varphi$.

There is a one-to-one correspondence between the difference and the actual phase difference. For example, when the actual phase difference is 195°, the difference is a, and when the actual phase difference is 15°, the difference is b. a and b are not equal. Therefore, when the distance between the first antenna and the second antenna is greater than the half wavelength corresponding to the first channel, even if the calculated output first phase difference is not accurate, for example, the output first phase difference is 15°, but the actual phase difference is 195°, the actual phase difference can also be accurately determined from the difference. Therefore, in this embodiment, first, according to the correlation between the difference and the actual phase difference, it is possible to determine the actual phase difference corresponding to the difference, and then the angle from the target device to the terminal is determined according to the actual phase difference, for example, is calculated according to the above formula.

Figure 10:
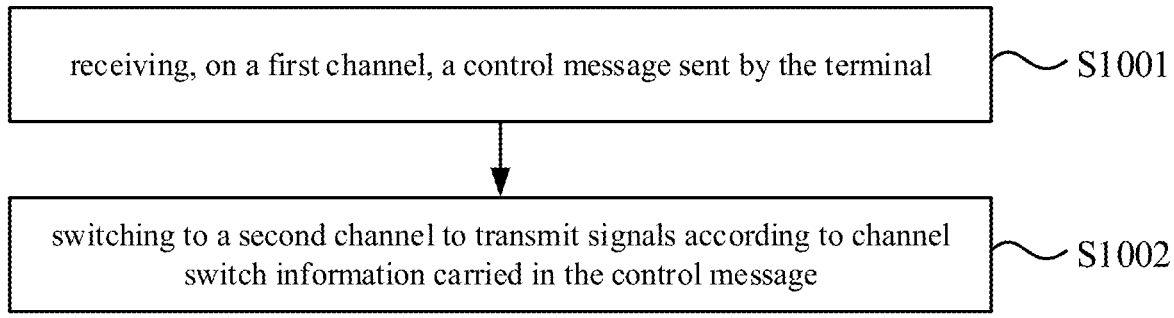
FIG. 10 is a schematic flowchart of a method for transmitting signals according to an embodiment of the present disclosure.

FIG. 10 is a schematic flowchart of method for transmitting signals according to an embodiment of the present disclosure. The method for transmitting signals can be applied to a target device, and the target device may be any device capable of communicating with the terminal in the above embodiments, including but not limited to an electronic device such as a mobile phone, a tablet computer, a wearable device, and a personal computer.

As shown in FIG. 10, the method for transmitting signals may include the following steps.

In step S1001, a control message sent by a terminal is received on a first channel.

In step S1002, switch to a second channel to transmit signals according to the channel switching information carried in the control information;

The target device transmits a first signal to the terminal on the first channel, and transmits a second signal to the terminal on the second channel, so that the terminal can determine the angle from the target device to the terminal according to the first signal and the second signal.

It should be noted that the operation of transmitting the first signal to the terminal on the first channel may be performed before receiving the control message or after receiving the control message, and the operation of transmitting the second signal to the terminal on the second channel may be performed before receiving the control message or after receiving the control message. The specific execution order can be set as required.

In one or more embodiments, the terminal switches to the second channel to receive the signal transmitted by the target device. On the one hand, the terminal needs to switch to the second channel, and on the other hand, the target device also needs to switch to the second channel.

In order to enable the target device to switch to the second channel, when the terminal performs two-way ranging with the target device on the first channel, the terminal can carry channel switch information in the CM sent to the target device, and instruct the target device to switch to the second channel for transmitting signals through the channel switch information.

Therefore, after performing two-way ranging with the terminal on the first channel, for example, after sending the RRRM to the terminal, the target device can switch to the second channel for transmitting signals to the terminal according to the channel switch information. Accordingly, there is no need to indicate to the target device that it needs to switch to the second channel for transmitting signals through a separate piece of information, which is beneficial to saving communication resources.

In one or more embodiments, the first frequency corresponding to the first channel and the second frequency corresponding to the second channel include at least one of the following: 6489.6 MHz, 6988.8 MHz, 7488.0 MHz, 7987.2 MHz.

In one or more embodiments, the channel switch information is carried in reserved bits of the control message.

In the related art, the control message may include parameters such as UWB message ID, Reserved, Message control, Stride length, etc., wherein the reserved bits may be 4 bits.

As shown in Table 1, in this embodiment, channel switch information may be further added to the control message, and the channel switch information may be carried in the reserved bits, for example, 3 bits in the reserved bits are occupied, then 1 bit is left in the reserved bits.

For example, if the channel switch information is 0, it may indicate channel switch disabled; if the channel switch information is 1, it may indicate switching to channel 5 (CH5); if the channel switch information is 2, it may indicate switching to channel 6 (CH6); if the channel switch information is 3, it may indicate switching to channel 8 (CH8); if the channel switch information is 4, it may indicate switching to channel 9 (CH9).

In one or more embodiments, the channel switch information is configured to indicate at least one of the following:
  channel switch disabled;
  the target channel to switch to.

As shown in Table 1, the channel switch information can not only indicate the target channel that the target device needs to switch to, that is, the second channel, but also indicate the channel switch disabled. For example, when the channel switch information is 0, it indicates channel switch disabled, so that it is possible to control whether the target device can perform channel switch, so as to prevent the target device from switching to another channel by mistake, which causes problems with the terminal sending and receiving signals from the target device.

Figure 11:
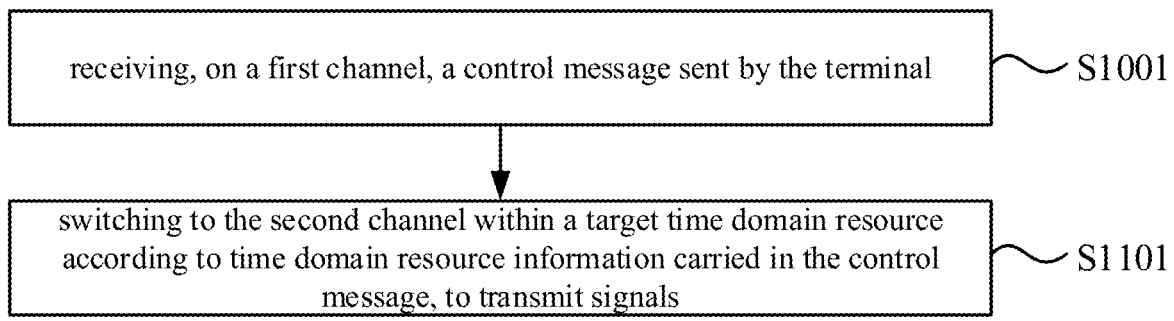
FIG. 11 is a schematic flowchart of another method for transmitting signals according to an embodiment of the present disclosure.

FIG. 11 is a schematic flowchart of another method for transmitting signals according to an embodiment of the present disclosure. As shown in FIG. 11, the switching to the second channel to transmit signals includes:

in step S1101, switching to the second channel within a target time domain resource according to time domain resource information carried in the control message, to transmit signals.

In one or more embodiments, when the terminal instructs the target device to perform communication, on the one hand, it needs to indicate the frequency domain resource for communication to the target device, and on the other hand, it also needs to indicate the time domain resource for communication to the target device. The channel switch information may instruct the target device to switch to a second channel for communication, and the second channel is equivalent to the frequency domain resource.

On this basis, this embodiment further carries time domain resource information in the control message to instruct the target device to switch to the second channel within the target time domain resource, to transmit signals, so that on the one hand, the terminal can switch to the second channel within the target time domain resource to receive the signal transmitted by the target device, and on the other hand, the target device can switch to the second channel in the target time domain resource to transmit signals to the terminal, to ensure that the terminal can receive the signal transmitted by the target device, on the second channel in the target time domain resource, thereby determining the second phase difference.

In one or more embodiments, the time domain resource information is carried in a ranging device management list of the control message.

In the control message CM, in addition to the elements shown in Table 1, it can also include other elements, such as the ranging device management list. Some elements of the ranging device management list can be as shown in Table 2 above.

The ranging device management list can include Ranging Role, Ranging Slot Index, Address, Scheduled UWB Message, Stop Ranging, Reserved bits.

The time domain resource information is carried by the control message CM, which may be carried in the ranging device management list, for example, indicated by the ranging slot index in Table 2. In the related art, for example, as shown in FIG. 5A, the ranging slot indices may indicate si1 to si6, and in this embodiment, the ranging slot indices may also indicate si7.

In one or more embodiments, the method further includes:
  determining an identifier of the signal transmitted on the second channel according to the control message.

The control message includes the ranging device management list, and the ranging device management list includes a Scheduled UWB Message, and the Scheduled UWB Message carries identification information for indicating the identifier of the signal transmitted by the target device on the second channel.

In one or more embodiments, the identifier of the CSM that needs to be sent by the target device can also be indicated by the scheduled UWB message in Table 2, so that the target device can send the CSM corresponding to the identifier in si7. For example, the identifier corresponding to CSM can be added on the basis of the identifier corresponding to the sent message in the related art, so that the terminal can determine according to the identifier that the received message is the CSM transmitted by the target device.

For example, the identifier UWB message ID corresponding to the message may be as shown in Table 3 above. As shown in Table 3, the identifiers corresponding to messages such as RIM, RRM, RFM, and CM are shown. In this embodiment, an identifier 0×7 may be added to the table to represent the CSM.

Figure 12:
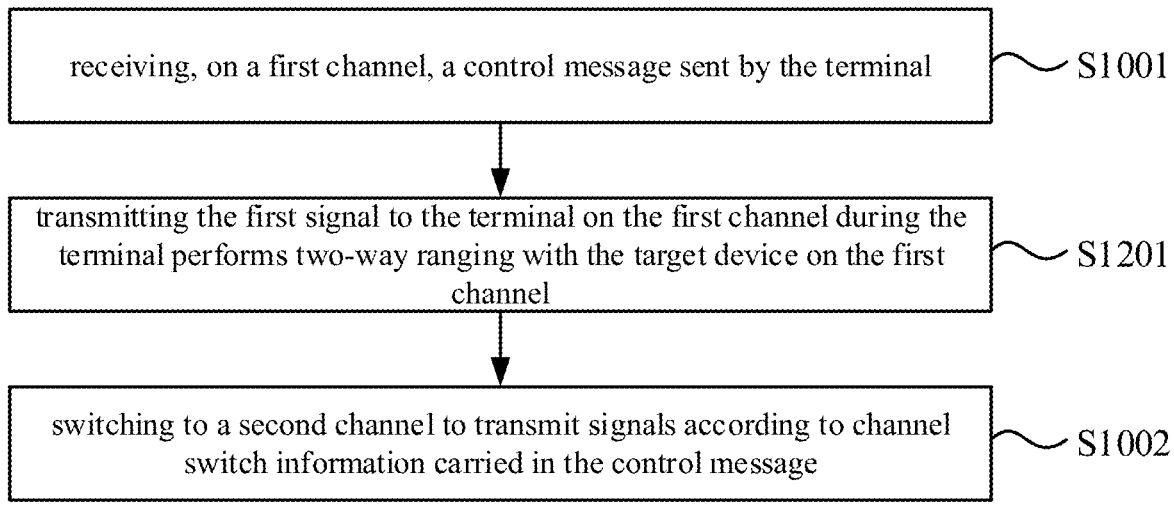
FIG. 12 is a schematic flowchart of yet another method for transmitting signals according to an embodiment of the present disclosure.

FIG. 12 is a schematic flowchart of yet another method for transmitting signals according to an embodiment of the present disclosure. As shown in FIG. 12, the method further includes S1201.

In step S1201, in the process of the terminal performing two-way ranging with the target device on the first channel, the first signal is transmitted to the terminal on the first channel.

In one or more embodiments, in order to determine the angle, the difference between the first phase difference and the second phase difference needs to be determined, and then the angle is determined according to the difference. In order to determine the difference, the terminal needs to first receive the signal transmitted by the target device on the first channel, and then switch to the second channel to receive the signal transmitted by the target device.

At present, the terminal generally determines the first phase difference in the process of performing two-way ranging with the target device. Therefore, in this embodiment, the terminal may be set to determine the first phase difference in the process of performing two-way ranging with the target device on the first channel, without setting the terminal to determine the first phase difference in another separate process.

Figure 13:
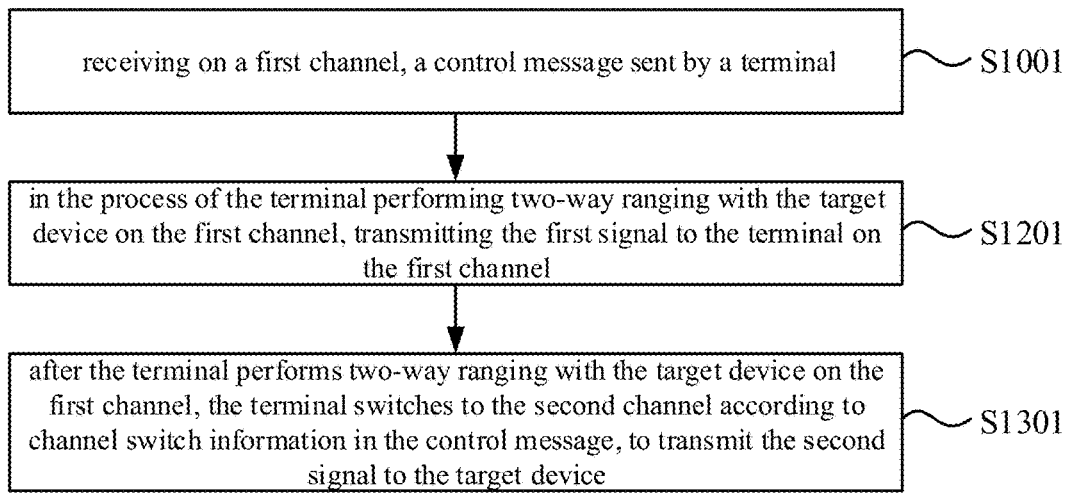
FIG. 13 is a schematic flowchart of yet another method for transmitting signals according to an embodiment of the present disclosure.

FIG. 13 is a schematic flowchart of yet another method for transmitting signals according to an embodiment of the present disclosure. As shown in FIG. 13, the switching to the second channel to transmit signals includes S1301.

In step S1301, after the terminal performs two-way ranging with the target device on the first channel, the terminal switches to the second channel to transmit the second signal to the target device.

According to an embodiment of the present disclosure, for example, as shown in FIG. 5B, the target device can determine that the target time domain resource is si7 according to the time domain resource information, and the target device can switch to the second channel (e.g. CH9) in si7 to transmit a signal, such as CSM to the terminal.

Accordingly, in the process of transmitting and receiving signals from si1 to si6, it is not necessary to switch to the second channel, so that a complete two-way ranging process can be completed between the terminal and the target device on the first channel (for example, the operation corresponding to si1 to si6).), and then the terminal switches to the second channel for communication, so that the current two-way ranging process does not need to be changed, which facilitates the expansion and implementation of this embodiment.

Corresponding to the foregoing embodiments of the method for determining an angle, the present disclosure also provides embodiments of an apparatus for determining an angle.

Figure 14:
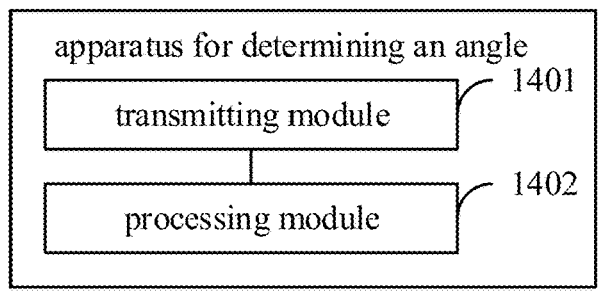
FIG. 14 is a schematic block diagram of an apparatus for determining an angle according to an embodiment of the present disclosure.

FIG. 14 is a schematic block diagram of an apparatus for determining an angle according to an embodiment of the present disclosure. The apparatus for determining an angle may be applied to a terminal, and the terminal includes but is not limited to an electronic device such as a mobile phone, a tablet computer, a wearable device, and a personal computer.

In one or more embodiments, the terminal can measure the distance to the target device and the angle between the target device and the terminal using the UWB technology, for example, can measure the incident angle of the target device towards the terminal, which can also be called the angle of arrival (AOA).

In one or more embodiments, the terminal is provided with at least a first antenna and a second antenna, and the terminal can measure and measure the angle through the first antenna and the second antenna.

As shown in FIG. 14, the apparatus for determining an angle may include a transmitting module 1401 and a processing module 1402.

The transmitting module 1401 is configured to send a control message to a target device on the first channel, wherein the control message carries at least channel switch information, which is configured to instruct the target device to transmit a signal on a second channel.

The processing module 1402 is configured to determine an angle from the target device to the terminal according to a first signal and a second signal, wherein the first signal transmitted by the target device is received on the first channel, and the second signal transmitted by the target device is received on the second channel.

In one or more embodiments, the channel switch information is carried in reserved bits of the control message.

In one or more embodiments, the channel switch information is configured to indicate at least one of: channel switch disabled; and a target channel to switch to.

In one or more embodiments, the control message further carries time domain resource information, which is configured to instruct the target device to switch to the second channel to transmit signals within the target time domain resource.

In one or more embodiments, the apparatus further includes: a receiving module configured to switch to the second channel within the target time domain resource to receive the signal transmitted by the target device.

In one or more embodiments, the time domain resource information is carried in a ranging device management list of the control message.

In one or more embodiments, the control message includes a ranging device management list, and the ranging device management list includes a Scheduled UWB Message, and the Scheduled UWB Message carries identification information configured to indicate an identifier of a signal transmitted by the target device on the second channel.

In one or more embodiments, the apparatus further includes: performing two-way ranging with the target device on the first channel, wherein the first signal transmitted by the target device is received during the two-way ranging.

In one or more embodiments, the processing module is further configured to receive on the second channel, the second signal transmitted by the target device, after performing two-way ranging with the target device on the first channel.

In one or more embodiments, the first frequency corresponding to the first channel and the second frequency corresponding to the second channel include at least one of following frequencies: 6489.6 MHz, 6988.8 MHz, 7488.0 MHz, and 7987.2 MHz.

In one or more embodiments, the terminal is provided with at least a first antenna and a second antenna, and the processing module is configured to determine a first phase difference of receiving the first signal transmitted by the target device through the first antenna and the second antenna, and determine a second phase difference of receiving the second signal transmitted by the target device through the first antenna and the second antenna; calculate a difference between the first phase difference and the second phase difference; determine the angle from the target device to the terminal according to the difference.

In one or more embodiments, the processing module is configured to determine an actual phase difference corresponding to the difference according to a correlation between the difference and the actual phase difference, and determine the angle from the target device to the terminal according to the actual phase difference.

Figure 15:
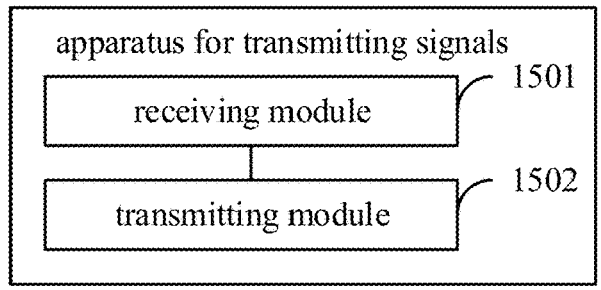
FIG. 15 is a schematic block diagram of an apparatus for transmitting signals according to an embodiment of the present disclosure.

FIG. 15 is a schematic block diagram of an apparatus for transmitting signals according to an embodiment of the present disclosure. The apparatus for transmitting signals can be applied to a target device, and the target device may be any device capable of communicating with the terminal in the above embodiment, including but not limited to an electronic device such as a mobile phone, a tablet computer, a wearable device, and a personal computer.

As shown in FIG. 15, the apparatus may include a receiving module 1501 and a transmitting module 1502.

The receiving module 1501 is configured to receive on a first channel, a control message sent by the terminal;

The transmitting module 1502 is configured to switch to the second channel to transmit signals according to channel switching information carried in the control message.

The target device is configured to transmit a first signal to the terminal on the first channel, and transmit a second signal to the terminal on the second channel, so that the terminal determines the angle from the target device to the terminal according to the first signal and the second signal.

In one or more embodiments, the channel switch information is carried in reserved bits of the control message.

In one or more embodiments, the channel switch information is configured to indicate at least one of: channel switch disabled; and a target channel to switch to.

In one or more embodiments, the transmitting module is configured to switch to the second channel to transmit signals within a target time domain resource according to time domain resource information carried in the control message.

In one or more embodiments, the time domain resource information is carried in a ranging device management list of the control message.

In one or more embodiments, the apparatus further includes: a processing module configured to determine, according to the control message, an identifier of a signal transmitted on the second channel.

The control message includes a ranging device management list, and the ranging device management list includes a Scheduled UWB Message, and the Scheduled UWB Message carries identification information for indicating a signal transmitted by the target device on the second channel.

In one or more embodiments, the transmitting module is further configured to transmit the first signal to the terminal on the first channel during the process of the terminal performing two-way ranging with the target device on the first channel.

In one or more embodiments, the transmitting module is configured to transmit the second signal to the target device on the second channel after the terminal performs two-way ranging with the target device on the first channel.

In one or more embodiments, the first frequency corresponding to the first channel and the second frequency corresponding to the second channel include at least one of following frequencies: 6489.6 MHz, 6988.8 MHz, 7488.0 MHz, and 7987.2 MHz.

Regarding the apparatus in the above embodiments, the specific manner in which each module performs operations has been described in detail in the embodiments of the method, and will not be described in detail here.

For the apparatus embodiments, since they basically correspond to the method embodiments, reference may be made to the partial descriptions of the method embodiments for related parts. The apparatus embodiments described above are only illustrative, wherein the modules described as separate components may or may not be physically separated, and the components displayed as modules may or may not be physical modules, that is, they may be located in one place, or may be distributed over multiple network modules. Some or all of the modules can be selected according to actual needs to achieve the purpose of the solution of the present disclosure. Those of ordinary skill in the art can understand and implement it without creative effort.

Figure 16:
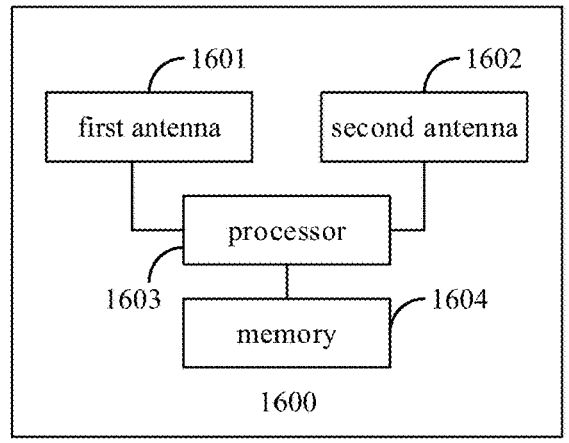
FIG. 16 is a schematic diagram of an electronic device according to an embodiment of the present disclosure.

FIG. 16 is a schematic diagram of an electronic device according to an embodiment of the present disclosure.

Embodiments of the present disclosure also provide an electronic device 1600, including: a first antenna 1601, a second antenna 1602 and a processor 1603; a memory 1604 configured to store instructions executable by the processor. The processor 1603 is configured to implement the method for determining an angle described in any of the above embodiments.

Figure 17:
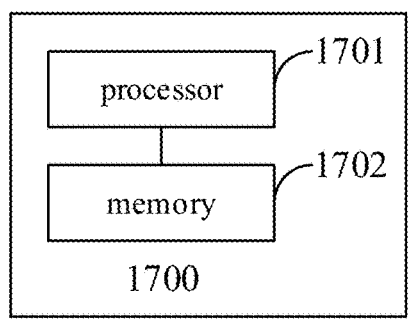
FIG. 17 is a schematic diagram of an electronic device according to an embodiment of the present disclosure.

FIG. 17 is a schematic diagram of an electronic device according to an embodiment of the present disclosure.

Embodiments of the present disclosure also provide an electronic device 1700, including: a processor 1701; a memory 1702 configured to store instructions executable by the processor. The processor is configured to implement the method for transmitting signals described in any of the foregoing embodiments.

Embodiments of the present disclosure also provide a computer-readable storage medium, on which a computer program is stored, and when the program is executed by a processor, the steps in the method for determining an angle described in any of the foregoing embodiments are implemented.

Embodiments of the present disclosure further provide a computer-readable storage medium, on which a computer program is stored, and when the program is executed by a processor, the steps in the method for transmitting signals described in any of the foregoing embodiments are implemented.

Figure 18:
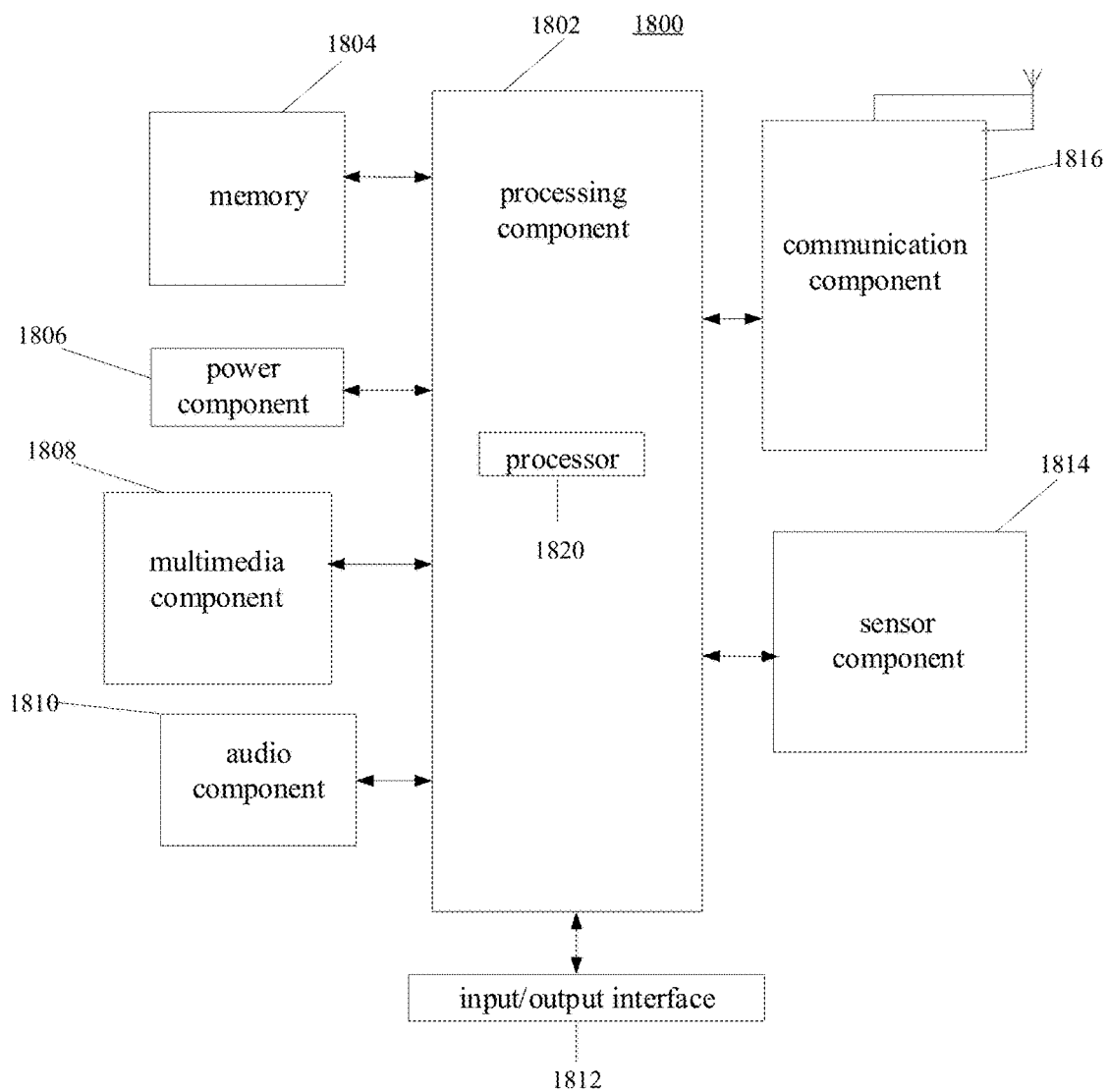
FIG. 18 is a schematic block diagram of an apparatus for determining an angle and/or transmitting signals according to an embodiment of the present disclosure.

FIG. 18 is a schematic diagram of an apparatus 1800 for determining an angle and/or transmitting signals according to an embodiment of the disclosure. For example, the apparatus 1800 may be a mobile phone, a computer, a digital broadcasting terminal, a message transceiver device, a game console, a tablet device, a medical device, a fitness device and a personal digital assistant.

As illustrated in FIG. 18, the apparatus 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 generally controls overall operation of the apparatus 1800, such as the operations associated with display, telephone calls, data communications, camera operations, and recording operations. The processing component 1802 may include one or more processors 1820 to execute instructions to perform all or part of the steps in the above described method. Moreover, the processing component 1802 may include one or more modules which facilitate the interaction between the processing component 1802 and other components. For instance, the processing component 1802 may include a multimedia module to facilitate the interaction between the multimedia component 408 and the processing component 1802.

The memory 1804 is configured to store various types of data to support the operation of the apparatus 1800. Examples of such data include instructions for any applications or methods operated on the apparatus 1800, contact data, phonebook data, messages, pictures, video, etc. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the apparatus 1800. The power component 1806 may include a power management system, one or more power sources, and any other components associated with the generation, management, and distribution of power in the apparatus 1800.

The multimedia component 1808 includes a screen providing an output interface between the apparatus 1800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 includes a front-facing camera and/or a rear-facing camera. When the apparatus 1800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1810 is configured to output and/or input audio signals. For example, the audio component 1810 includes a microphone (MIC) configured to receive an external audio signal when the apparatus 1800 is in an operation mode, such as a call mode, a recording mode, and a voice recognition mode. The received audio signal may be further stored in the memory 1804 or transmitted via the communication component 1816. In some embodiments, the audio component 1810 further includes a speaker to output audio signals.

The I/O interface 1812 provides an interface between the processing component 1802 and peripheral interface modules, such as a keyboard, a click wheel, buttons, and the like. The buttons may include, but are not limited to, a home button, a volume button, a starting button, and a locking button.

The sensor component 1814 includes one or more sensors to provide status assessments of various aspects of the apparatus 1800. For instance, the sensor component 1814 may detect an open/closed status of the apparatus 1800, relative positioning of components, e.g., the display and the keypad, of the apparatus 1800, a change in position of the apparatus 1800 or a component of the apparatus 1800, a presence or absence of user contact with the apparatus 1800, an orientation or an acceleration/deceleration of the apparatus 1800, and a change in temperature of the apparatus 1800. The sensor component 1814 may include a proximity sensor configured to detect the presence of nearby objects without any physical contact. The sensor component 1814 may also include a light sensor, such as a CMOS or CCD image sensor, for use in imaging applications. In some embodiments, the sensor component 1814 may also include an accelerometer sensor, a gyroscope sensor, a magnetic sensor, a pressure sensor, or a temperature sensor.

The communication component 1816 is configured to facilitate communication, wired or wirelessly, between the apparatus 1800 and other devices. The apparatus 1800 can access a wireless network based on a communication standard, such as WiFi, 2G, or 3G, or a combination thereof. In an exemplary embodiment, the communication component 1816 receives a broadcast signal or broadcast associated information from an external broadcast management system via a broadcast channel. In an exemplary embodiment, the communication component 1816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for determining an angle and/or the method for transmitting signals described in any of foregoing embodiments.

In exemplary embodiments, there is also provided a non-transitory computer readable storage medium including instructions, such as included in the memory 1804, executable by the processor 1820 in the apparatus 1800, for performing the above method. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining an angle, comprising:
sending, by a terminal, a control message to a target device on a first channel, wherein the control message carries channel switch information and a ranging device management list, wherein the channel switch information is configured to indicate to the target device a second channel to switch to, and the ranging device management list comprises a scheduled ultra-bandwidth (UWB) message and a ranging slot index, wherein the scheduled UWB message carries identification information configured to indicate identifiers of UWB messages for two-way ranging and an identifier of a channel switch message, and the ranging slot index indicates time domain resources for the two-way ranging and a target time domain resource for switching to the second channel and transmission of the channel switch message on the second channel;

switching, by the terminal, to the second channel within the target time domain resource, and receiving the channel switch message transmitted by the target device on the second channel within the target time domain resource; and determining, by the terminal, an angle from the target device to the terminal according to a first signal and a second signal, wherein the first signal transmitted by the target device is received on the first channel, and the second signal transmitted by the target device is received on the second channel.

2. The method of claim 1, wherein the channel switch information is carried in reserved bits of the control message.

3. The method of claim 1, wherein the channel switch information is further configured to indicate channel switch disabled.

4. The method of claim 1, further comprising:
performing two-way ranging with the target device on the first channel, wherein the first signal transmitted by the target device is received during performing the two-way ranging.

5. The method of claim 4, further comprising:
after performing the two-way ranging with the target device on the first channel, receiving, on the second channel, the second signal transmitted by the target device.

6. The method of claim 1, wherein a first frequency corresponding to the first channel and a second frequency corresponding to the second channel comprise at least one of following frequencies:
6489.6 MHz, 6988.8 MHz, 7488.0 MHz, and 7987.2 MHz.

7. The method of claim 1, wherein at least a first antenna and a second antenna are provided in the terminal, and determining the angle from the target device to the terminal according to the first signal and the second signal comprises:
determining a first phase difference of receiving the first signal transmitted by the target device through the first antenna and the second antenna, and determining a second phase difference of receiving the second signal transmitted by the target device through the first antenna and the second antenna;
calculating a difference between the first phase difference and the second phase difference;
determining the angle from the target device to the terminal according to the difference.

8. The method of claim 7, wherein determining the angle from the target device to the terminal according to the difference comprises:
determining an actual phase difference corresponding to the difference according to a correlation between the difference and the actual phase difference;
determining the angle from the target device to the terminal according to the actual phase difference.

9. An electronic device, comprising:
a first antenna, a second antenna, and a processor;
a memory configured to store instructions executable by the processor;
wherein the processor is configured to:
send a control message to a target device on a first channel, wherein the control message carries channel switch information and a ranging device management list, wherein the channel switch information is configured to indicate to the target device a second channel to switch to, and the ranging device management list comprises a scheduled ultra-bandwidth (UWB) message and a ranging slot index, wherein the scheduled UWB message carries identification information configured to indicate identifiers of UWB messages for two-way ranging and an identifier of a channel switch message, and the ranging slot index indicates time domain resources for the two-way ranging and a target time domain resource for switching to the second channel and transmission of the channel switch message on the second channel;
switch to the second channel within the target time domain resource, and receive the channel switch message transmitted by the target device on the second channel within the target time domain resource; and
determine an angle from the target device to the electronic device according to a first signal and a second signal, wherein the first signal transmitted by the target device is received on the first channel, and the second signal transmitted by the target device is received on the second channel.

* * * * *